United States Patent

[11] 3,587,768

| [72] | Inventor | Johannes Ortheil |
| | | Anrath, Allee Lo, Germany |
| [21] | Appl. No. | 844,293 |
| [22] | Filed | July 24, 1969 |
| [45] | Patented | June 28, 1971 |
| [73] | Assignee | Langen & Company |
| | | Dusseldorf, Germany |
| [32] | Priority | Aug. 1, 1968 |
| [33] | | Germany |
| [31] | | P 17 80 104.6 |

[54] HYDRAULIC AUXILIARY POWER STEERING MEANS FOR VEHICLES
1 Claim, 2 Drawing Figs.

[52] U.S. Cl. .................................................. 180/79.2R,
  92/33
[51] Int. Cl. ................................................... B62d 5/10
[50] Field of Search .......................................... 180/79.2;
  92/33; 74/388 (PS)

[56] References Cited
UNITED STATES PATENTS

| 3,121,345 | 2/1964 | Zeigler et al. | 180/79.2X |
| 3,180,233 | 4/1965 | Jablonsky | 180/79.2X |

*Primary Examiner*—Benjamin Hersh
*Assistant Examiner*—John A. Pekar
*Attorney*—Holman & Stern

ABSTRACT: A hydraulic auxiliary power steering means for vehicles in which a steering spindle constituted by two components movable by a small amount relative to each other is provided with a control valve which, for the purpose of generating an auxiliary force, due to the relative movement between the components allows a pressure medium to flow to or from the active surfaces of a piston which slides in a nonrotatable and fluidtight manner in a nonrotatable cylinder. The piston is provided in its interior with a screw thread particularly a recirculating ball thread which coacts with that component constituting the steering spindle which is remote from the steering wheel.

HYDRAULIC AUXILIARY POWER STEERING MEANS FOR VEHICLES

BACKGROUND OF THE INVENTION

Auxiliary power steering systems are known in numerous and varied designs and German Pat. No. 1,133,642 is referred to as an example of such a system. In this patent, the movement of the piston is transmitted, by means of a rack fastened thereto, to gear segments which drive the steering shaft or spindle. Such a design is objectionable in that the piston effecting the auxiliary power must always be disposed in proximity to the steering shaft. It is not possible to arrange the auxiliary power piston at any desired point or location on the steering shaft for reasons of assembly space or better accessibility.

Hence, it is an important object of the present invention to provide an auxiliary power steering system of the type under consideration which will enable the assembly of the auxiliary power unit to be effected at any desired point or location on the steering spindle and this is accomplished in a compact form from a space aspect.

SUMMARY OF THE INVENTION

The problem is solved by the present invention in that the steering spindle enters and extends through the housing constituting the cylinder and that the piston adjacent to the screw thread is provided with a smooth bore which is entered in a tight fashion by a corresponding portion or component of the steering spindle with the lead of the screw thread being so steep that a translatory movement of the piston, avoiding self-locking, is transformed into a rotary movement of the steering spindle and the steering spindle is connected with the remainder of the steering mechanism exteriorly of a housing of the cylinder.

By virtue of the invention, there is provided a particularly advantageous auxiliary power unit which, due to its small dimensions and by being disposed coaxially with respect to the steering spindle, can be assembled thereon at any location in the majority of vehicles without a substantial redesigning of the vehicle.

Further objects and advantages of the invention will become more readily apparent to persons skilled in the art from the following detailed specification and annexed drawings and in which drawings:

DETAILED DESCRIPTION OF THE INVENTION

Figure 1:
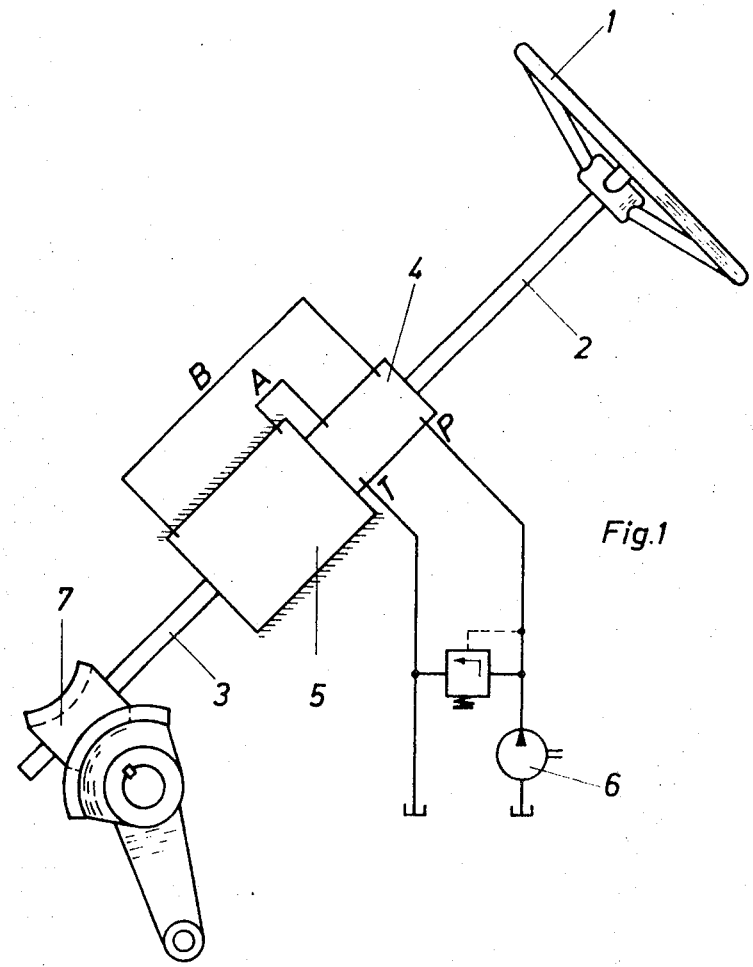
FIG. 1 is a diagrammatic view illustrating an auxiliary power steering means embodying the invention.

As illustrated in FIG. 1 a steering spindle or shaft is defined by two components 2 and 3 and a steering wheel 1 is suitably attached to the component 2. The component 2 is axially or radially movable by a small amount relative to the component 3 and this amount is sufficient to actuate a control valve 4. An auxiliary power unit denoted generally 5 is disposed about the component 3 of the steering spindle and fluid lines A and B lead to the power unit 5 and such lines are, by means of the control valve 4, connected either to a pump 6 or a drain T.

The component 3 of the steering spindle is operably connected to a steering transmission or steering linkage 7.

Figure 2:
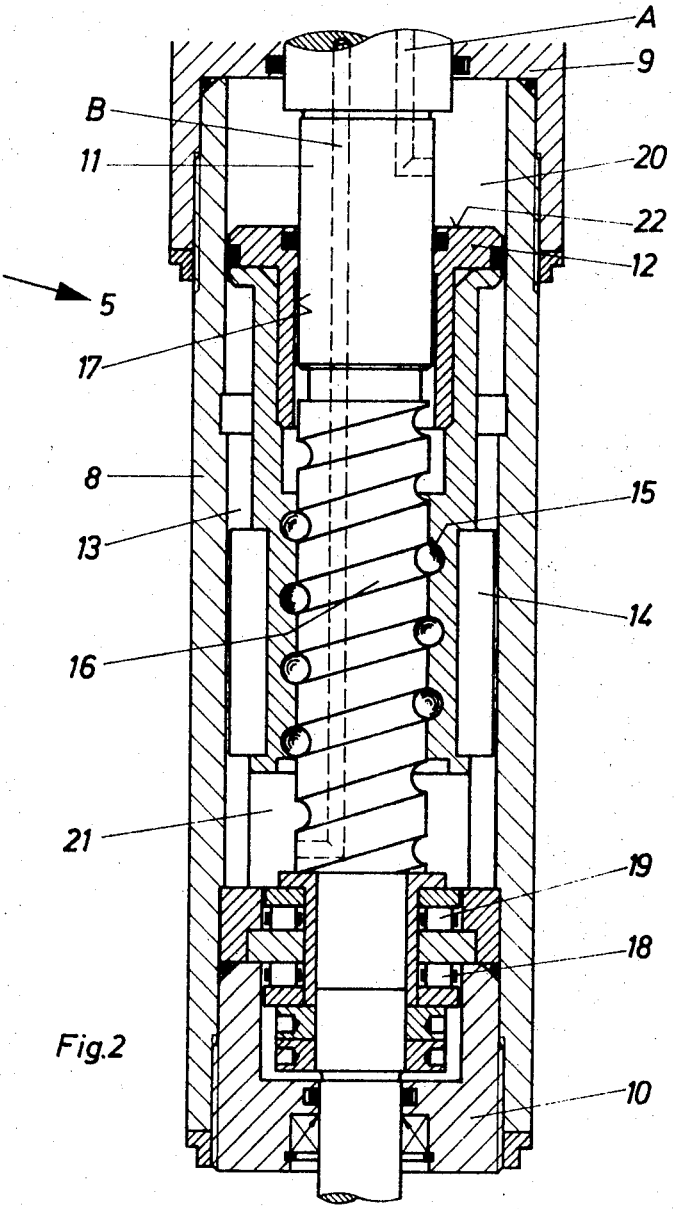
FIG. 2 is a fragmentary view partly in elevation and partly in cross section of the auxiliary power unit.

As shown in FIG. 2, the auxiliary power unit 5 includes a cylinder 8 whose housing is rigidly connected or secured to the vehicle. The housing of the cylinder 8 is provided with facing end walls 9 and 10 respectively and it will be noted that the component 3 of the steering spindle extends through these walls in a tight or close manner. The component 3 of the steering spindle within the cylinder 8 is provided adjacent to end wall 9 with a smooth cylindrical portion 11 on which a hollow piston 12 slides in a seallike manner. The piston 12 is also tightly guided within the cylinder for sliding yet nonrotatable movement. This is due to the fact that grooves 13 in the cylinder accommodate keys 14 provided for the piston 12.

The piston 12 in its interior is provided with, over a portion of its length, a screw thread 15 which coacts or cooperates with a corresponding screw thread 16 on the component 3 of the steering spindle adjacent to which there is provided a smooth bore 17. In order to reduce or minimize friction, the threads 15 and 16 are designed as recirculating ball threads of a lead which excludes self-locking. Forces which act axially upon the component 3 of the steering spindle are absorbed by thrust bearings 18 and 19.

Working spaces 20 and 21 are defined or constituted by the cylinder 8, the end walls 9 and 10 and the steering spindle and these spaces can be charged with a pressure medium through the lines A and B which lines are channels provided in the steering spindle.

The auxiliary power steering operates as follows:

The turning of the steering wheel 1 effects a relative twisting of the component 2 relative to the component 3 whereby the control valve 4 (not illustrated in detail) is actuated and connects, for example, the pump 6 with the line A. The pressure medium flows through the line A into the working space 20 wherein it exerts a pressure upon active face area 22 of the hollow piston 12 which, as a consequence, attempts to move in the axial direction. The screw thread translates its movement into a rotary movement of the steering spindle.

The actuation of the control valve 4 and the direction of the screw threads 15, 16 are so harmonized that the component 3 of the steering spindle rotates in the same direction as the component 2. The pressure medium displaced from the working space 20 by the axial movement of the piston 12 reaches the drain T through the line B and the control valve 4. Upon the steering wheel 1 being turned in the opposite direction, the working space 21 is charged with a pressure medium via the control valve 4 and the line B while the working space 20 is connected with the drain T.

This invention is not to be confined to any strict conformity to the showings in the drawings but changes or modifications may be made therein so long as such changes or modifications mark no material departure from the spirit and scope of the appended claims.

I claim:

1. A hydraulic auxiliary power steering means for vehicles including a steering spindle defined by first and second components movable by a small amount relative to each other, said first component being directed towards a steering wheel and said second component being directed away from the steering wheel, a nonrotatable cylinder adapted to be attached to a vehicle, a wall for each end of the cylinder, a hollow piston slidably yet nonrotatably mounted within the cylinder, the interior of the piston having a thread, said second spindle component extending into and through said end walls of said cylinder in a fluidtight manner, said piston adjacent the thread having a smooth bore, said second component having a smooth periphery extending into said smooth bore and a thread corresponding to the thread of the piston, the lead of said threads being so steep that a translatory movement of the piston, avoiding self-locking, is transformed into rotary movement of the second component, steering mechanism connected to said second component exteriorly of the cylinder, pressure medium working spaces at opposite ends of the piston defined by the cylinder, the end walls of the cylinder, and the second spindle component, a source of pressure medium, a drain, conduit means leading to each working space, and a valve operable by relative movement between said first and second components controlling the flow of the pressure medium through said conduit means so that turning of the first component in one direction actuates the valve to permit pressure medium to flow through the conduit means to one of the working spaces to move the piston in one direction so that the thread translates its movement into rotary movement of the second component in the same direction as the first component with the pressure medium displaced from the other working space reaching the drain via the conduit means and valve while upon turning of the first component in the opposite direction, the pressure medium is introduced into the other working space to displace the piston in the opposite direction whereby the thread translates its movement into rotary movement of the second component in the same direction as the first component with the pressure medium displaced from the first-mentioned working space reaching the drain via the conduit means and valve.